(12) United States Patent
Goepner

(10) Patent No.: US 11,027,953 B2
(45) Date of Patent: Jun. 8, 2021

(54) METHOD FOR MONITORING THE ROAD PATH OF A TRUCK AND A FLOOR CONVEYOR

(71) Applicant: Jungheinrich Aktiengesellschaft, Hamburg (DE)

(72) Inventor: Oliver Goepner, Oering (DE)

(73) Assignee: Jungheinrich Aktiengesellschaft, Hamburg (DE)

(*) Notice: Subject to any disclaimer, the term of this patent is extended or adjusted under 35 U.S.C. 154(b) by 281 days.

(21) Appl. No.: 16/052,259

(22) Filed: Aug. 1, 2018

(65) Prior Publication Data
US 2019/0071292 A1    Mar. 7, 2019

(30) Foreign Application Priority Data

Aug. 2, 2017    (DE) .................. 102017117545.8

(51) Int. Cl.
*B66F 9/07* (2006.01)
*B66F 9/075* (2006.01)
*G01S 7/497* (2006.01)
*B60W 30/095* (2012.01)
*B66F 17/00* (2006.01)
*G01S 17/931* (2020.01)
*B66F 9/06* (2006.01)
(Continued)

(52) U.S. Cl.
CPC ....... *B66F 9/0755* (2013.01); *B60W 30/0953* (2013.01); *B66F 9/063* (2013.01); *B66F 17/003* (2013.01); *G01S 7/4972* (2013.01); *G01S 17/931* (2020.01); *B66F 9/24* (2013.01);
*G01S 17/42* (2013.01); *G01S 2013/932* (2020.01); *G05B 19/41895* (2013.01); *G05B 2219/31005* (2013.01); *G05D 1/0231* (2013.01); *G05D 2201/0216* (2013.01)

(58) Field of Classification Search
CPC ..................................................... G01S 17/931
See application file for complete search history.

(56) References Cited

U.S. PATENT DOCUMENTS 5,938,710 A * 8/1999 Lanza ..................... B66F 9/063
180/169
2002/0165654 A1* 11/2002 Weaver ............. B60R 21/01336
701/45
(Continued)

FOREIGN PATENT DOCUMENTS

DE    202005004466 U1    9/2005
DE    102004047212 A1    4/2006
(Continued)

OTHER PUBLICATIONS

EP 20180186478; filed Jul. 31, 2018; European Search Report dated Jan. 4, 2019 (10 pages).

*Primary Examiner* — Alex C Dunn
(74) *Attorney, Agent, or Firm* — Barclay Damon LLP

(57) ABSTRACT

A method for monitoring the travel path of an industrial truck, comprising the steps of: determining a braking distance of the industrial truck on the basis of at least one operating parameter of the industrial truck, adjusting a travel path area monitored by a monitoring device on the basis of the determined braking distance by adjusting the alignment of the monitoring device, decelerating the industrial truck when an obstacle enters the travel path.

18 Claims, 3 Drawing Sheets

(51) Int. Cl.
  *G01S 17/42* (2006.01)
  *G01S 13/931* (2020.01)
  *B66F 9/24* (2006.01)
  *G05B 19/418* (2006.01)
  *G05D 1/02* (2020.01)

(56) References Cited

U.S. PATENT DOCUMENTS

| | | | |
|---|---|---|---|
| 2006/0267327 A1* | 11/2006 | Jablonski | F16M 13/00 280/766.1 |
| 2010/0114405 A1* | 5/2010 | Elston | B66F 9/0755 701/2 |
| 2012/0078471 A1* | 3/2012 | Siefring | B66F 9/07581 701/41 |
| 2014/0114526 A1* | 4/2014 | Erb | G01S 17/931 701/28 |
| 2014/0277691 A1* | 9/2014 | Jacobus | B66F 9/063 700/216 |
| 2015/0029332 A1 | 1/2015 | Milstead | |
| 2016/0259982 A1* | 9/2016 | Shivanandaiah | H04N 7/183 |
| 2018/0316895 A1* | 11/2018 | McClelland | H04N 7/188 |
| 2018/0356223 A1* | 12/2018 | Lukic | G01C 25/00 |
| 2018/0356249 A1* | 12/2018 | Lukic | G01C 15/004 |
| 2019/0033459 A1* | 1/2019 | Tisdale | G01S 7/4808 |

FOREIGN PATENT DOCUMENTS

| | | |
|---|---|---|
| DE | 102007060433 A1 | 6/2009 |
| DE | 202012004038 U1 | 8/2013 |
| DE | 112011104645 T5 | 10/2013 |
| DE | 102015224309 A1 | 6/2017 |
| DE | 102016117589 A1 | 3/2018 |
| EP | 2079065 A2 | 7/2009 |
| EP | 2339376 A1 | 6/2011 |
| EP | 2722687 A1 | 4/2014 |
| JP | S63-27398 A | 2/1988 |
| JP | 2015170284 A | 9/2015 |
| WO | 2009/063318 A1 | 5/2009 |

\* cited by examiner

METHOD FOR MONITORING THE ROAD PATH OF A TRUCK AND A FLOOR CONVEYOR

CROSS REFERENCE TO RELATED INVENTION

This application is based upon and claims priority to, under relevant sections of 35 U.S.C. § 119, German Patent Application No. 10 2017 117 545.8, filed Aug. 2, 2017, the entire contents of which are hereby incorporated by reference.

BACKGROUND

The disclosure relates to a method for monitoring the travel path of an industrial truck, and to an industrial truck operative to monitor its travel history.

Industrial trucks are known to have assistance systems for monitoring their surroundings. For example, monitoring devices can be provided which monitor the travel path of the industrial truck for collision avoidance, i.e., in order to prevent a collision with obstacles such as persons or assets. For this purpose, sensors are often provided on the front side, i.e., on a drive part of the industrial truck, and/or also on the rear side, i.e., on a load part of the industrial truck. Such monitoring devices usually have a static detection area, to monitor the travel path at a fixed distance from the industrial truck. In this instance, however, the monitoring sensor system must be designed for the maximum braking distance of the industrial truck in order to ensure timely stopping of the industrial truck. However, it will be appreciated that the braking distance of the an industrial truck is not always the same, but rather is dependent on the travel speed and/or the weight of the industrial truck. Accordingly, especially at slow speeds or low load weight, an unnecessary or premature stopping of the industrial truck can occur. This can cause unnecessary delays and loss of efficiency.

From EP 20 79 065 A2, an industrial truck is known with monitoring sensors for detecting obstacles, wherein the range of the sensors can be adapted on the software side depending on the speed of the industrial truck.

BRIEF SUMMARY OF THE INVENTION

The disclosure is directed to a method for monitoring the travel path of an industrial truck, and, furthermore, to an industrial truck for carrying out the same, which optimizes the braking distance of the industrial truck, i.e., causes the truck to brake at the latest possible time.

The method includes the following steps of:
determining a braking distance by a control device employing at least one operating parameter of the industrial truck,
adjusting the area monitored by a monitoring or sensing device on the basis of the determined braking distance and by adjusting the alignment of the monitoring device, and,
braking the industrial truck when an obstacle enters the area monitored by the monitoring device.

The industrial truck according to the disclosure comprises at least one monitoring device for monitoring a travel path area for obstacles; a control unit; and at least one actuator acting on the monitoring device. The control unit being determines a braking distance of the industrial truck based on at least one operating parameter of the industrial truck, controls the at least one actuator for aligning the monitoring device, and brakes the industrial truck when an obstacle enters the monitored area.

According to the disclosure, the control device evaluates one or more operating parameters of the industrial truck, continuously or at periodic intervals, and determines an optimum braking distance of the industrial truck on the basis of the operating parameters. As a consequence, the control device determines the minimum necessary braking distance that the industrial truck requires for safely stopping in a given operating situation. The braking distance is always selected such that a safe stopping distance is ensured.

To ensure a safe braking distance, the alignment of at least one monitoring device is adjusted as a function of the determined braking distance, and the area monitored by the monitoring or sensing device is adjusted. The area monitored is adjusted by at least one actuator which changes the location or alignment of the monitoring device. That is, the at least one actuator effects a mechanical adjustment of the monitoring device, i.e., the alignment thereof. By aligning the monitoring device, the area monitored by the monitoring or sensing device is shifted accordingly. For example, the at least one monitoring device may be tilted downward or upward or rotated to one of its sides, as will be explained later.

When an obstacle, for example a person, enters the monitored area, the industrial truck decelerates. In this instance, the presence of an obstacle within the monitored area can be determined, for example, via an evaluation of the signal propagation/reflection. Signals emitted by the at least one monitoring device are reflected by the obstacle and subsequently captured again by the same or different monitoring device. The at least one monitoring device can be a laser scanner, for example.

According to the disclosure, dynamic monitoring of the travel path can be effected by monitoring the travel speed of the industrial truck as one operating parameter. In the event of a high travel speed, the area monitored may be shifted forwardly, i.e., further in front of the industrial truck. On the other hand, at low speed the alignment of the monitoring device may be adjusted. At a high speed, the industrial truck already detects obstacles entering the monitored area at a great distance from the industrial truck which enables timely deceleration. At low travel speeds, the monitoring devices may be aligned such that the monitored area is in the immediate vicinity of the industrial truck. Accordingly, detection of obstacles only takes place in close proximity to the industrial truck. Due to the low travel speed, safe stopping is nevertheless possible. Due to this dynamic travel path monitoring, the industrial truck is no longer stopped unnecessarily or too early, but rather ideally in the immediate vicinity of the obstacle. In this instance, the monitored area is adjusted by a mechanical alignment of the monitoring device itself According to one embodiment of the disclosure, the at least one operating parameter is selected from the group of: a travel speed of the industrial truck, a steering angle of the industrial truck, a lifting height of a load part of the industrial truck, a load weight of a load transported by the industrial truck, and a load center of gravity of a load transported by the industrial truck. One or more of the aforementioned can thus be used as operating parameters. For monitoring the operating parameters, the industrial truck can employ sensors which are respectively designated for this purpose and which are in contact with the control device. As a general rule, the braking distance of the industrial truck may increase, for example, at a high travel speeds, given a large lifting height of the load part, or given a high load weight. In this event, the control device can align the monitoring device via the at least one actuator in such a way that the monitored travel path area is arranged at a correspondingly large distance from the industrial truck. In the event of a low travel speed, a low height of the load part, or a small load weight, the travel path area can again be located a rather short distance from the industrial truck via corresponding alignment of the monitoring device. Depending on a steering angle of the industrial truck, the control device can, for example, align the at least one monitoring device in such a way that the monitored travel path area is adjusted to the left or right, i.e., to either side, of the industrial truck. The monitored area thus follows a steering movement. This is particularly expedient for cornering in warehouses.

According to one embodiment, the method includes the step of tilting the monitoring device about a horizontal axis for adjusting the monitored travel path area along a travel axis of the industrial truck, and/or swiveling the monitoring device about a vertical axis for adjusting the monitored travel path area to either side of the industrial truck. The at least one actuator may also be designed to tilt the monitoring device about a horizontal axis in order to adjust the monitored travel path area along a travel axis of the industrial truck, and/or to swivel the monitoring device about a vertical axis in order to adjust the monitored travel path area to the sides of the industrial truck. In particular, at least two actuators may also be provided, wherein a first actuator is designed to tilt the monitoring device about a horizontal axis in order to adjust the monitored travel path area along a travel axis of the industrial truck, and a second actuator is designed to swivel the monitoring device about a vertical axis in order to adjust the monitored area to either side. The at least one monitoring device can thus be aligned by tilting or swiveling the monitoring device. A tilting about a horizontal axis denotes, in this instance, an alignment downward in the direction of the floor supporting the industrial truck, or upward in the opposite direction. The horizontal axis thus extends parallel to the floor, and in particular perpendicular to a direction of travel of the industrial truck. The swiveling of the at least one monitoring device denotes an alignment of the monitoring device to the left or right, i.e., to either side of the industrial truck. The vertical axis is in this instance perpendicular to the floor, and in particular also perpendicular to the direction of travel. The tilting of the at least one monitoring device enables the monitored travel path area to be adjusted along the travel axis, and thus enables the monitored travel path area to be a different distance from the industrial truck. The swiveling of the monitoring devices allows the monitored travel path area to be adjusted to the right or left of either side in deviation from the travel axis, which is particularly important in the case of cornering. The at least one monitoring device can in this instance in particular be swiveled to the sides as a function of the steering angle of the industrial truck, as already mentioned above. The at least one actuator of the industrial truck can be designed in such a way that it enables both the tilting and the swiveling of the monitoring devices. However, different actuators can also be provided for performing the aforementioned movements.

BRIEF DESCRIPTION OF THE DRAWINGS

The present invention is disclosed with reference to the accompanying drawings, wherein.

DETAILED DESCRIPTION OF THE INVENTION

Figure 1:
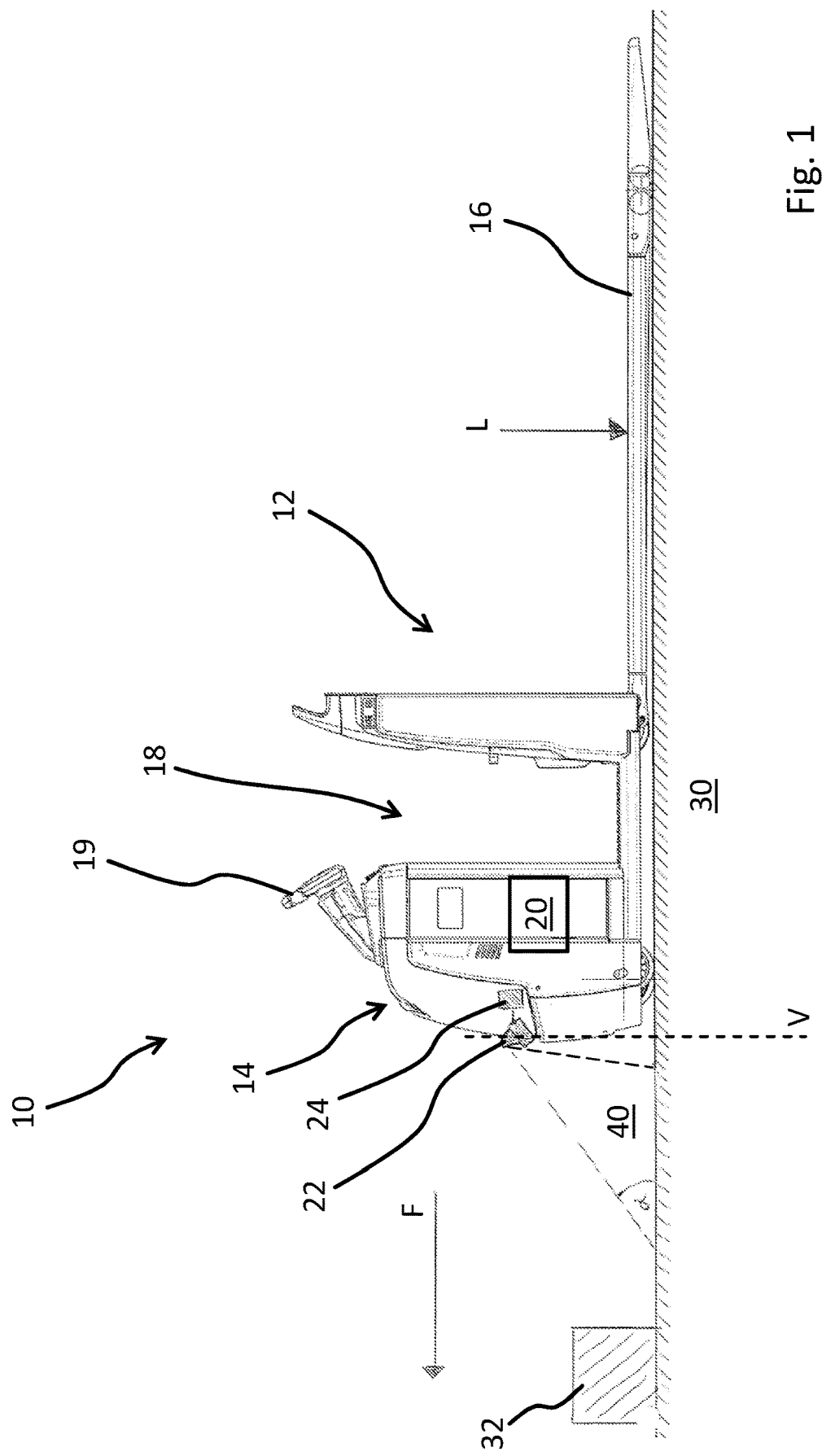
FIG. 1 shows an industrial truck according to the disclosure in a lateral or profile view.
Figure 2:
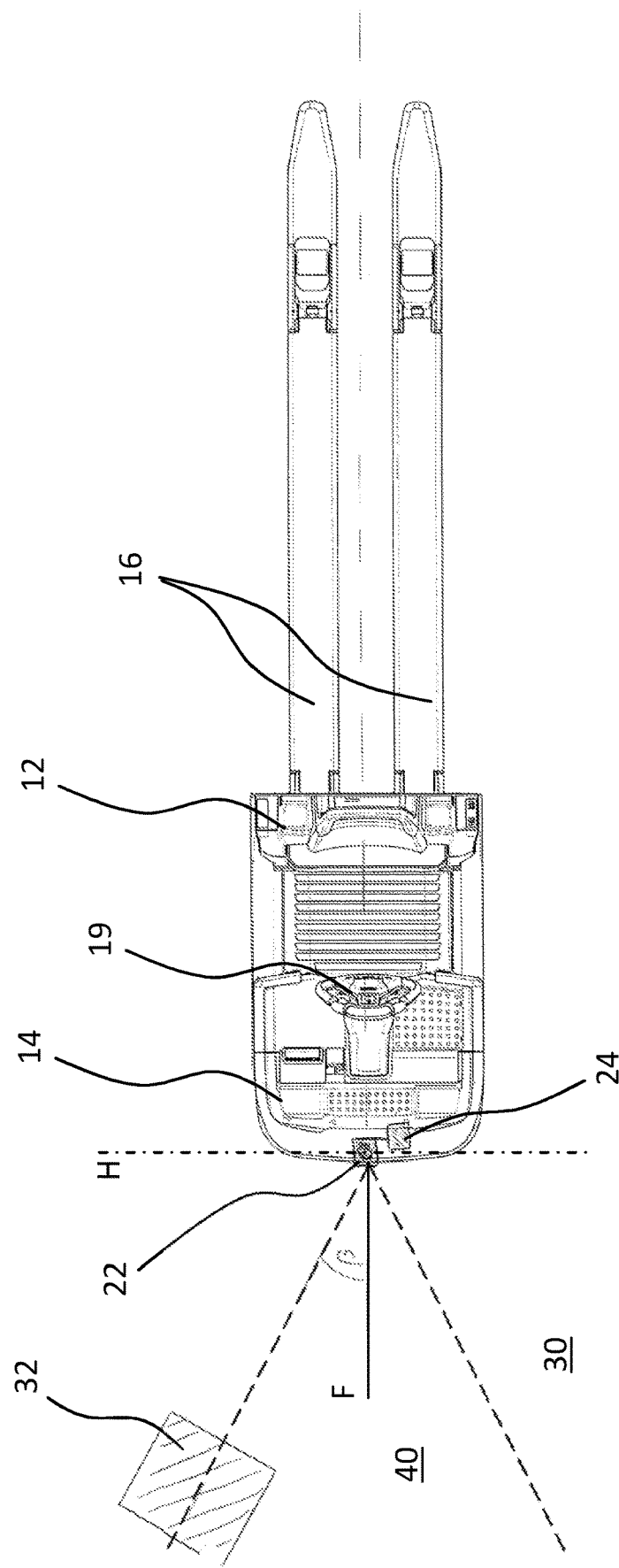
FIG. 2 shows a plan view of the industrial truck in FIG. 1.

FIGS. 1 and 2 show an industrial truck 10 having a load part 12 and a drive part 14. The load part 12 has two load forks 16 for receiving a load acting with a load weight L. The industrial truck 10 also has a driver's cab 18 for an operator, and an operating element 19 for the control device 20 of the industrial truck. On the front side of the industrial truck 10, a monitoring device 22 is arranged on the drive part 14, which monitoring device 22 can be aligned via an actuator 24. The monitoring device 22 generates an cone-shaped detection area which defines a travel path area 40 to be monitored.

The control device 20 monitors one or more operating parameters of the industrial truck 10 by means of one or more sensors (not shown), and calculates a required braking distance of the industrial truck based thereon. Depending on the braking distance determined, the control device 20 controls an actuator 24, which in turn displaces or aligns the monitoring device 22. On the one hand, the actuator 24 can tilt the monitoring device 22 downward or upward about a horizontal axis H by changing a tilt angle $\alpha$, and, on the other hand, can swivel to either side about a vertical axis V by varying a swivel angle $\beta$.

The monitored travel path area 40, shown in FIG. 1, is located in close proximity to the industrial truck 10. This setting is selected when the at least one operating parameter yields a short braking distance, for example, on the basis of a low travel speed. Such setting prevents the industrial truck 10 from decelerating too early due to an obstacle 32 locating in its path, so as to cause the industrial truck to stop at a rather large distance therefrom. If the evaluation of the at least one operating parameter, for example the travel speed, results in the necessity for a larger braking distance, the monitored travel path area 40 may be adjusted further forward in the direction of travel along the travel leg F, as seen in FIG. 1. In this instance, the tilt angle $\alpha$ is reduced such that the obstacle is not detected until the industrial truck 10 is closer, i.e., in terms of its distance along the monitored travel path area 40. The obstacle 32 may then detected by the monitoring device 22, and the industrial truck 10 is decelerated. For decelerating, the control device 20 can, for example, control the brakes (not shown) of the industrial truck 10. The industrial truck 10 can thus react to the obstacle 32 promptly even at an increased speed.

Alternatively, the monitoring device 22 can also be swiveled by the actuator 24 to either side of the industrial truck 10 so that the angle $\beta$ between a leg F of the monitored travel path area 40 and the monitored travel path area 40 is increased or decreased. The monitoring device 22 can be swiveled as a function of a steering angle of the industrial truck 10. For example, if an operator located in the driver's cab 18 steers to the right via the operating element 19, the detection area, and thus the monitored travel path area 40, can likewise move to the right (i.e., upward in FIG. 2). Obstacles entering the travel path 30 can thus be detected early. When steering to the left, the monitored travel path area 40 can likewise be adjusted to the left (i.e., downward in FIG. 2). In this instance, the monitored travel path area 40 can be adjusted to the left by correspondingly strong swiveling of the monitoring device 22 that the obstacle 32 is no longer within the monitored travel path area 40. In this instance, the obstacle 32 is no longer relevant since, due to the steering movement, the industrial truck 10 drives past the obstacle 32 along curved path to the left. Accordingly, since there is no risk of collision with the obstacle 32, the industrial truck 10 does not stop and is not delayed.

In another embodiment, two actuators can be employed for aligning the monitoring device 22. A first actuator may be designed to tilt while a second actuator may be employed to swivel the monitoring device 22, as explained above.

Figure 3:
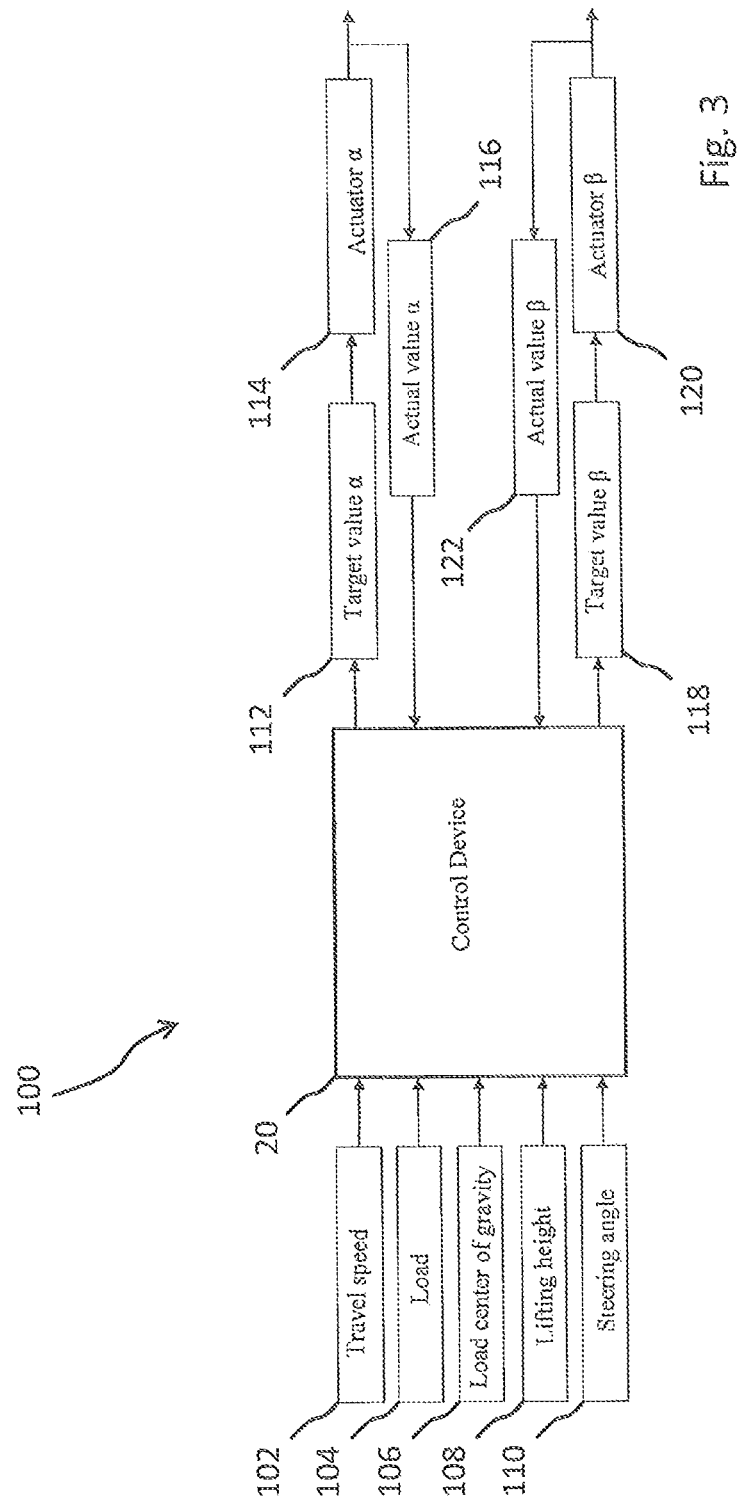
FIG. 3 is a schematic control diagram of the control device for adjusting the monitoring device(s).

FIG. 3 shows a control scheme with input and output values of the control device 20. A variety of operating parameters may be employed, inter alia, in the control device 20, a travel speed 102, a load 104, a load center of gravity 106, a lifting height 108 of the load part 12, and/or a steering angle 110. The control device 20 calculates, in real time, a required braking distance of the industrial truck from the vehicle parameters 102-110. Depending on the calculated braking distance, the control device 20 outputs a target value α (reference symbol 112) for the tilt angle α to a first actuator 114, as well as a target value β (reference symbol 118) for the swivel angle β to a second actuator 120. The actuators 114, 120 then align the monitoring device 22 accordingly. The current angle setting of the first actuator 114 is monitored by a sensor and provided as a feedback signal or an actual value a (reference symbol 116) to the control device 20. The current angle setting of the second actuator 120 is also monitored by means of a sensor, and provided as a feedback signal or an actual value β of the swivel angle (reference symbol 122) to the control device 20. By evaluating the actual values α, β, the instantaneous alignment of the monitoring device 22 is known to the control device 20, such that an accurate adjustment of the alignment can take place.

In another embodiment, it is also possible to provide a single actuator that can perform both functions, i.e., adjust both the tilt angle α and the swivel angle β. In this embodiment, both the target value α and the target value β are issued by the control device 20 to the single actuator, such that it aligns the monitoring device 22 and returns the respective actual values of α and β to the control device 20.

While the invention has been described with reference to particular embodiments, it will be understood by those skilled in the art that various changes may be made and equivalents may be substituted for elements thereof without departing from the scope of the invention. In addition, many modifications may be made to adapt a particular situation or material to the teachings of the invention without departing from the scope of the invention. For example, any one of a variety of monitoring devices may be employed for detecting obstacles within the travel path of the industrial truck, These may include Doppler-radar devices and/or, a laser scanner devices to monitor the travel path area.

Therefore, it is intended that the invention not be limited to the particular embodiments disclosed as the best mode contemplated for carrying out this invention, but that the invention will include all embodiments falling within the scope and spirit of the appended claims.

LIST OF REFERENCE SYMBOLS

10 Industrial truck
12 Load part
14 Drive part
16 Load forks
18 Driver's cab
19 Operating element
20 Control device
22 Monitoring device
24 Actuator
30 Travel path
32 Obstacle
40 Monitored travel path area
100 Control system
102 Travel speed
104 Load
106 Load center of gravity
108 Lifting height
110 Steering angle
112 Target value of the tilt angle
114 First actuator
116 Actual value of the tilt angle
118 Target value of the swivel angle
120 Second actuator
122 Actual value of the swivel angle
F Travel axis
H Horizontal axis
L Load weight
V Vertical axis
α Tilt angle
β Swivel angle.

The invention claimed is:

1. A method for monitoring a travel path of an industrial truck, comprising the steps of:
    determining a braking distance of the industrial truck using at least one operating parameter of the industrial truck;
    adjusting a travel path area monitored by a monitoring device on the basis of the determined braking distance, by adjusting an alignment of the monitoring device;
    decelerating the industrial truck when an obstacle enters the travel path area monitored by the monitoring device;
    measuring an instantaneous swivel angle; and
    comparing an instantaneous swivel angle to a target swivel angle for enhanced accuracy.

2. The method according to claim 1, wherein the step of adjusting a travel path area further comprises tilting the monitoring device about a horizontal axis for adjusting the monitored travel path area along a travel leg of the industrial truck.

3. The method according to claim 1, wherein the step of adjusting a travel path area further comprises swiveling the monitoring device about a vertical axis for adjusting the monitored travel path ara to either side of the industrial truck.

4. The method according to claim 2, wherein the step of adjusting a travel path area further comprises tiling the monitoring device about a horizontal axis for adjusting the monitored travel path area along a travel leg of the industrial truck.

5. The method according to claim 1, wherein the at least one operating parameter is selected from the group of: a travel speed of the industrial truck, a steering angle of the industrial truck, a lifting height of a load part of the industrial truck, a load weight of a load transported by the industrial truck, and a load center of gravity of a load transported by the industrial truck.

6. An industrial truck, comprising:
    at least one monitoring device for monitoring a travel path area for obstacles present therein, at least one actuator disposed in combination with the monitoring device, and a control unit configured to, determine a braking distance of the industrial truck as a function of at least one operating parameter of the industrial truck, calculate a target tilt angle based on the determined braking distance, and control the at least one actuator to align the monitoring device based on the calculated tile angle such that the industrial truck decelerates when an obstacle enters the monitored travel path area, wherein the at least one monitoring device includes a sensor for measuring an instantaneous tilt angle of the monitoring device and wherein the control unit compares the instantaneous tilt angle to the calculated tilt angle for enhanced accuracy.

7. The industrial truck according to claim 6, wherein the at least one actuator is configured to tilt the monitoring device about a horizontal axis in order to adjust the monitored travel path area along a travel leg of the industrial truck.

8. The industrial truck according to claim 6, wherein the at least one actuator is configured to swivel the monitoring device about a vertical axis in order to adjust the monitored travel path area to either side of the industrial truck.

9. The industrial truck according to claim 6, further comprising first and second actuators, a first actuator configured to tilt the monitoring device about a horizontal axis in order to adjust the monitored travel path area along a travel leg of the industrial truck, and a second actuator configured to swivel the monitoring device about a vertical axis in order to adjust the monitored area to either side of the industrial truck.

10. An industrial truck comprising:

at least one monitoring device for monitoring a travel path area for obstacles present therein;

at least one actuator disposed in combination with the monitoring device; and a control unit configured to determine a braking distance of the industrial truck as a function of at least one operating parameter of the industrial truck, and controlling the at least one actuator to align the monitoring device based on the determined braking distance such that the industrial truck decelerates when an obstacle enters the monitored travel path area, wherein the at least one monitoring device includes a sensor for measuring an instantaneous swivel angle and wherein the control unit compares instantaneous swivel angle to a target swivel angle for enhanced accuracy.

11. The industrial truck according claim 10, wherein the at least one monitoring device includes sensors for measuring an instantaneous tilt, and wherein the control unit evaluates the instantaneous tilt to a calculated tilt angle for enhanced accuracy.

12. The industrial truck according to claim 7 wherein the monitoring device is a laser scanner.

13. The industrial truck according to claim 8 wherein the monitoring device is a laser scanner.

14. The industrial truck according to claim 6, wherein the at least one operating parameter is selected from the group of: a travel speed of the industrial truck, a steering angle of the industrial truck, a lifting height of a load part of the industrial truck, a load weight of a load transported by the industrial truck, and a load center of gravity of a load transported by the industrial truck.

15. The industrial truck according to claim 7, wherein the at least one operating parameter is selected from the group of: a travel speed of the industrial truck, a steering angle of the industrial truck, a lifting height of a load part of the industrial truck, a load weight of a load transported by the industrial truck, and a load center of gravity of a load transported by the industrial truck.

16. The industrial truck according to claim 8, wherein the at least one operating parameter is selected from the group of: a travel speed of the industrial truck, a steering angle of the industrial truck, a lifting height of a load part of the industrial truck, a load weight of a load transported by the industrial truck, and a load center of gravity of a load transported by the industrial truck.

17. The industrial truck according to claim 9, wherein the at least one operating parameter is selected from the group of: a travel speed of the industrial truck, a steering angle of the industrial truck, a lifting height of a load part of the industrial truck, a load weight of a load transported by the industrial truck, and a load center of gravity of a load transported by the industrial truck.

18. The industrial truck of claim 10, wherein the at least one monitoring device is a laser scanner.

* * * * *